Aug. 21, 1962 P. E. LUTHER 3,050,090
LIQUID FILLING APPARATUS
Filed May 25, 1959 5 Sheets-Sheet 1

INVENTOR.
PAUL E. LUTHER
BY
Gardner & Zimmerman
ATTORNEYS

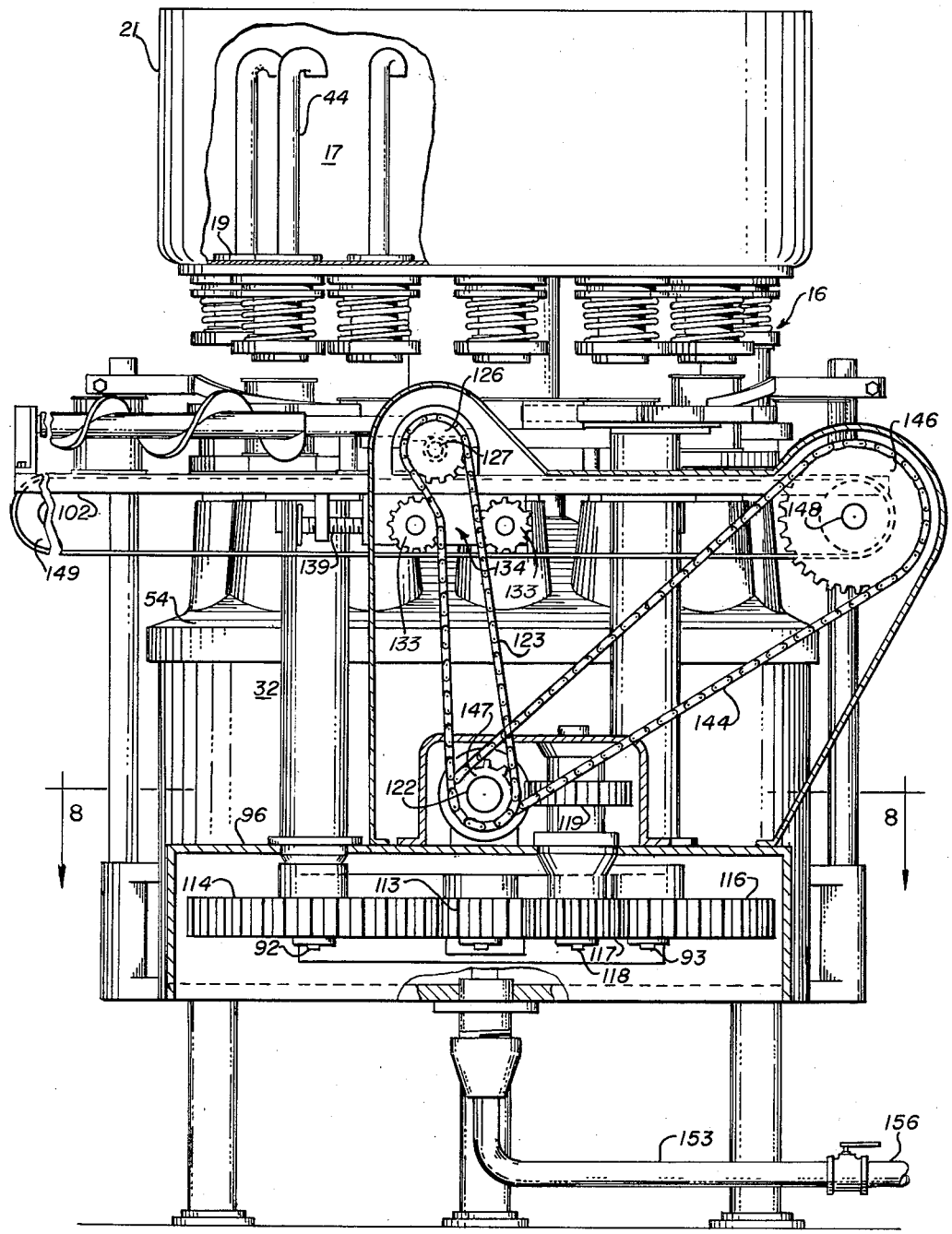

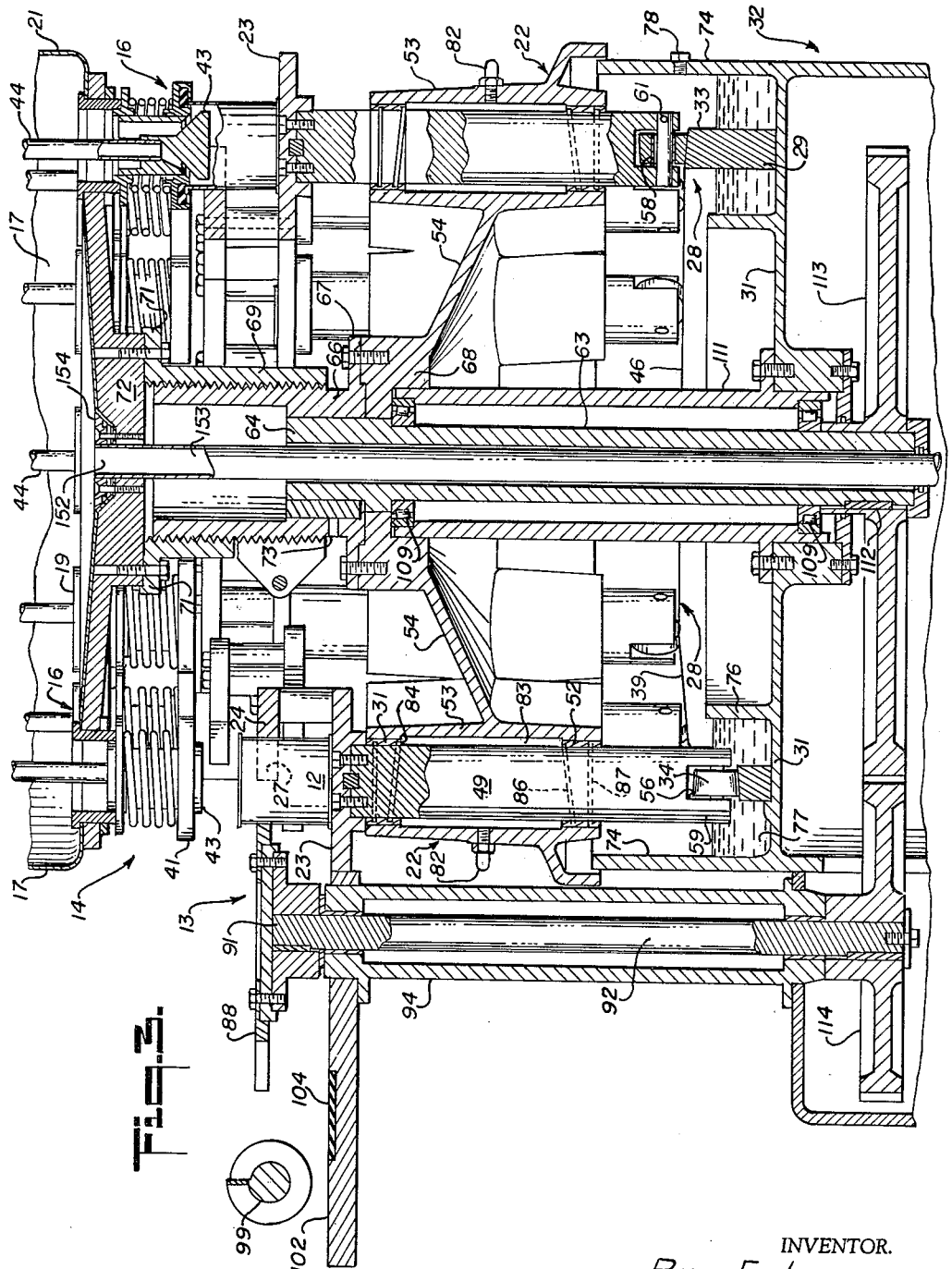

Aug. 21, 1962  P. E. LUTHER  3,050,090
LIQUID FILLING APPARATUS
Filed May 25, 1959  5 Sheets-Sheet 4

INVENTOR.
PAUL E. LUTHER
BY
Gardner + Zimmerman
ATTORNEYS

Aug. 21, 1962 P. E. LUTHER 3,050,090
LIQUID FILLING APPARATUS
Filed May 25, 1959 5 Sheets-Sheet 5

INVENTOR.
PAUL E. LUTHER
BY
*Gardner & Zimmerman*
ATTORNEYS

United States Patent Office 3,050,090
Patented Aug. 21, 1962

3,050,090
LIQUID FILLING APPARATUS
Paul E. Luther, 1807 107th Ave., Oakland, Calif.
Filed May 25, 1959, Ser. No. 815,476
6 Claims. (Cl. 141—150)

This invention relates to food machinery of the type generally utilized for filling containers with a liquid product.

The canning industry widely employs apparatus for the liquid filling of containers such as tin cans or glass jars in which the elevation of the containers from one plane to another serves to actuate a valve mechanism whereby the containers are filled with a product having liquid or semi-liquid properties such as juice, syrup, catsup, soup or the like. Upon completion of such filling, a reciprocal descent of the containers to the original plane operates the valve mechanism to close off the product flow, and the filled containers are then removed from the filling apparatus.

While in the filling apparatus the containers are aligned under and rotate with associated valves to follow a generally circular path of slightly less than 360 degrees of travel and are required to be disposed in the elevated valve-actuating position for at least 180 degrees of such travel in order to allow for the complete liquid filling of the containers. Additionally, approximately 60 degrees of the circular path is necessary for container entry into and exit from the filling means. It follows, accordingly, that elevation and descent of the containers from one plane to another must be accomplished in roughly 120 degrees of the total travel, thereby imposing a 60 degree limitation for container elevation and descent respectively. Such a limitation presents particular problems as it has been found that if the angles of ascent and descent are too steep various operational difficulties result.

In this respect trouble has been especially encountered when elevating containers which have previously been packed with a solid product such as fruit. In order to meet various weight requirements, the fruit when packed frequently extends above the top level of the containers and is intended to be compressed therein by the engagement of the fruit with the valve when the latter is in an open position. Too rapid elevation of the containers, however, tends to crush and bruise the fruit as it is being compressed within the containers thereby rendering the quality of the product below the required standards. Likewise, it has been found that too rapid container descent will tend to create a suction in the container so that it adheres to the valve after the container-supporting means has commenced to descend.

In this event, the weight of the container shortly overcomes the force of suction so that the container drops from valve engagement onto the support means, thereby causing excessive spillage of the product, and/or improper aligning of the container on the support means for removal from the filling apparatus.

Prior art devices have achieved proper container engagement with and disengagement from the valve mechanism in the required 60 degrees of travel in various ways which have, however, been characterized by certain drawbacks which have materially reduced the usefulness and efficiency of such devices.

By way of example, the speed of rotation of the filling means may be reduced to such a point that although the angle of container ascent and descent is steep the speed thereof is sufficiently slow to permit proper operation. This arrangement, however, seriously limits the number of containers such a device is able to process in a given length of time so that its efficiency is seriously reduced.

Alternatively, the diameter of the circular path of travel may be increased to permit a more gradual container elevation and descent in an equal number of degrees of travel, but such an increase is, in most cases, undesirable since a comparable increase is required in the overall dimensions of the apparatus so that considerably more space is required for installation and the linear velocity of container travel is undesirably increased.

Various other shortcomings are present in respect to the operation and construction of the prior art devices which will hereinafter be more fully discussed.

It is therefore an object of the present invention to provide a liquid filling apparatus of the type described which requires a minimum amount of space for installation, while at the same time affording improved means for container elevation and descent without reducing the number of containers processed in a given length of time.

Another object of the present invention is to provide a liquid filling apparatus of the type described in which the containers may be raised to and lowered from a valve actuating position at a controlled variable rate of speed while still maintaining the required time for the liquid filling of the containers.

Another object of the present invention is to provide an apparatus for the liquid filling of containers in which such containers upon introduction into the apparatus are first rapidly elevated to a plane substantially subjacent a valve engaging plane and thereafter gradually elevated to a valve actuating position so that solid products packed in the containers and extending thereabove may be gently urged into the interior of the containers to prevent bruising or other damage to the solid product.

Still another object of the present invention is to provide a liquid filling apparatus of the type described in which the liquid filled containers are gradually lowered from the valve actuating position thereby materially reducing the force of suction in the containers, the containers thereafter being rapidly lowered to a plane where they may be removed from the apparatus.

Yet another object of the present invention is to provide a liquid filling apparatus of the character described in which feed means for introducing containers into the apparatus may be adjustably timed relative to the weight of the containers and the speed of the conveyor in order that containers of different weights may be conveyed to the intake station of the apparatus in properly timed sequence.

A further object of the present invention is to provide an apparatus for the liquid filling of containers in which container elevating and lowering means is self-lubricating thereby eliminating the necessity for manual greasing of the mechanism.

Another object of the present invention is to provide a liquid filling apparatus of the type described in which the filler valves thereof are so constructed as to facilitate the passage therethrough of liquid products which carry solid or semi-solid particles such as soups, sauces and gravies.

A still further object of the present invention is to provide an apparatus for the liquid filling of containers in which power is transmitted to the feed conveyor means through a system of chains and sprockets rather than by a more conventional gear train, thereby eliminating transmission failure due to vibrations as well as providing a less expensive device.

Yet another object of the present invention is to provide a liquid filling device of the type described in which reciprocal vertically moving container platform shafts are provided with automatic peripheral greasing means to insure smooth and efficient operation thereof.

Another object of the present invention is to provide an apparatus for the liquid filling of containers in which the housing thereof is especially designed and arranged in such a manner as to eliminate the possibility of liquid or solid products entering into the operating mechanism of the device.

Still another object of the present invention is to provide a liquid filling apparatus of the type described in which a single conveyor belt is utilized for carrying containers to be filled to the filling means and subsequently conveying the filled containers away from the filling means.

A still further object of the present invention is to provide an apparatus of the type described in which power is transmitted from a single source to effect proper synchronization of the various operations involved.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

FIGURE 2 is a front elevational view of the apparatus illustrated in FIGURE 1, portions being broken away to more clearly show certain structural features.

FIGURE 3 is an enlarged elevational cross sectional view of the apparatus, the plane being taken on the line 3—3 of FIGURE 1.

Figure 1:
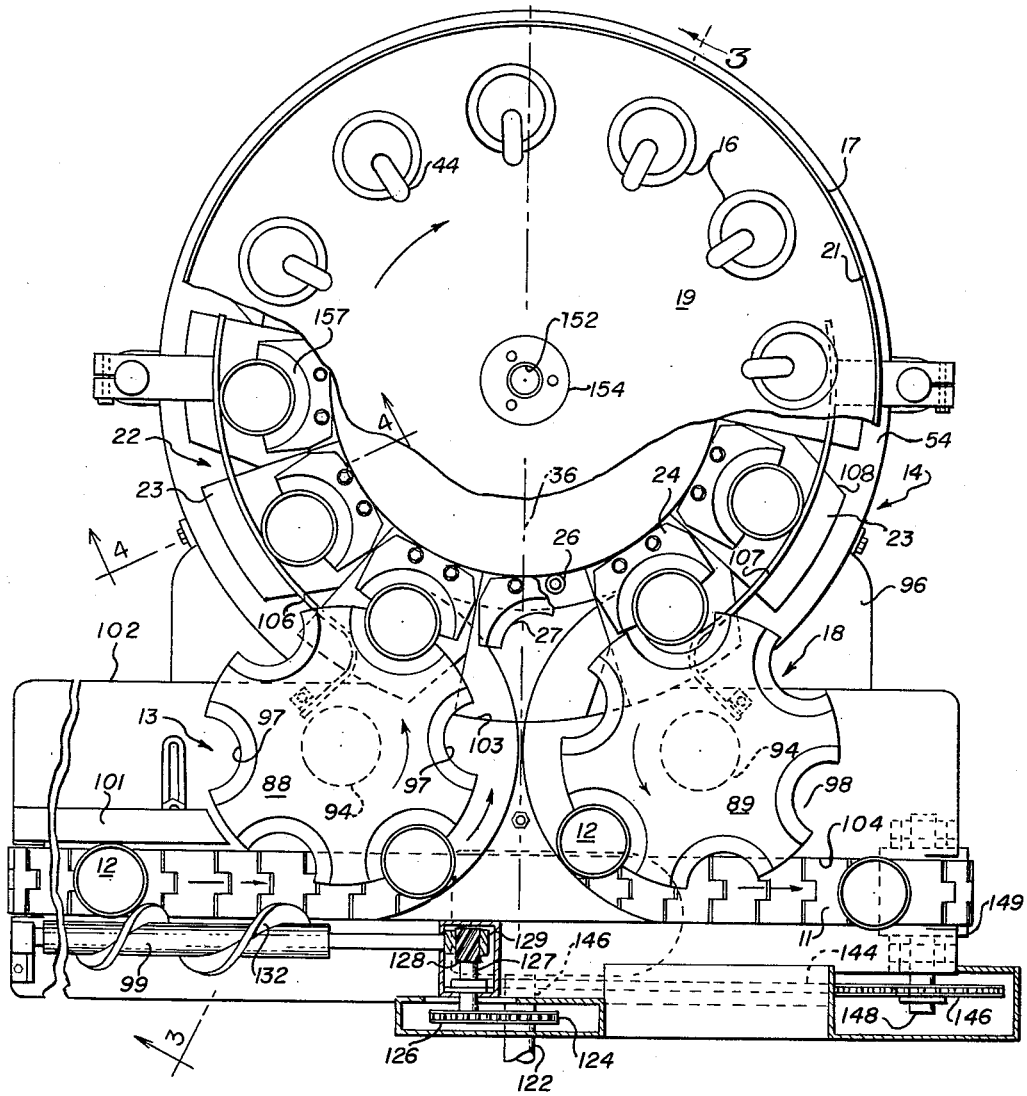
FIGURE 1 is a top plan view of the apparatus of the present invention for filling containers with liquid.
Figure 10:
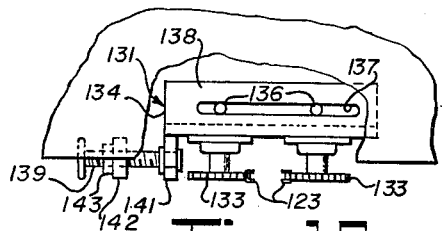
FIGURE 10 is a partial plan view illustrating the timing means of the apparatus, portions being broken away to more clearly illustrate the structure.

In broad terms the apparatus of the present invention comprises an endless conveyor belt 11 which carries containers 12 to an intake station 13 where the containers are removed from the conveyor and rotatable filling means 14. While in the filling means the containers are raised from the plane of the conveyor to a valve-actuating plane in which the containers are caused to open filler valves 16 whereby the liquid product is permitted to flow from a source of supply such as a bowl 17 or the like into the containers. Upon completion of the filling process the containers are lowered from the valve actuating plane thereby closing the valves, to the conveyor plane where they are removed from the filling means at the take off 18 and moved back onto the conveyor belt 11 for removal from the apparatus.

Considering now in greater detail the filling means 14, such means will be seen to comprise a generally vertically disposed rotatable cylindrical bowl 17 having a bottom 19 and sides 21 in which is stored the liquid product prior to introduction into the containers. A plurality of the valves 16 are disposed at equal circumferentially spaced intervals in the bottom 19 of the bowl adjacent the outer periphery thereof. The valve structure may be generally the same as that disclosed in my prior Patent No. 2,574,746 and is arranged to be opened when a can is forcibly urged against a lower annular portion thereof. Likewise the structure of the bowl and the manner of mounting the valves therein may be similar to that disclosed in my prior Patent 2,837,127.

Disposed subjacent the bowl and operatively connected thereto is an elevating mechanism 22 comprising a plurality of horizontal platforms 23 on which the containers are supported while in the filling means. Each platform is arranged for reciprocal movement vertically as well as for movement in a horizontal plane whereby each container is moved along a circular path from the intake station to the take off station while being raised to and lowered from the valve actuating position. As here shown, the platforms are in the form of equally divided, independently operating segments of an annular ring, with each segment being positioned directly under a valve for rotary movement with the latter. It will thus be understood that the number of segments or platforms 23 will necessarily correspond to the number of valves provided in the bowl. As will be seen in FIGURE 1 of the drawings each platform is provided with a spaced member 24 mounted thereabove by means of a pair of posts 26, the opposed ends thereof being secured to the platform and member respectively adjacent inner peripheral edges thereof. The member 24 has formed at its outer peripheral edge a semi-circular opening 27 which is adapted to partially encircle a container positioned on the platform at a point somewhat over half the can height. The openings 27 have a radius substantially the same as that of the containers and the centers of the semi-circular openings are aligned directly under the centers of the valves 16 whereby the containers will be positioned in alignment with the valves during the filling process.

The bowl 17 and the container elevating mechanism 22 rotate together at a uniform rate of speed as will be explained later, and when a container 12 has been carried by the conveyor belt 11 to the intake station 13, the opening 27 of one of the members 24 engages the container to rotate it with the filling means for approximately 300 degrees of travel, during which the container, which is aligned directly under a valve, is elevated to open the valve, liquid fills the container, and the container then descends thereby closing the valve shortly before the container reaches the take off station 18 where it is carried away by the conveyor belt 11.

As previously discussed the prior art liquid filling devices of the type described have encountered serious limitations due to the fact that gradual ascent and descent of the container has proved necessary for proper engagement and disengagement of the valves without spillage or damage to the contents of the container. In order to overcome such limitations I have here utilized a controlled variable rate of container ascent and descent whereby the size of the device may be substantially reduced without cutting down on the number of containers which the apparatus is capable of processing in a given length of time. To this end I have provided a cam mechanism 28 which comprises a stationary circular cam 29 mounted in alignment with and subjacent the platforms 23 on a horizontally extending plate 31 of a main housing 32. The cam 29 as illustrated in FIGURE 3 is provided with a cam surface 33 which is adapted to engage a plurality of rollers 34, each one being operatively carried by a platform 23.

Figure 9:
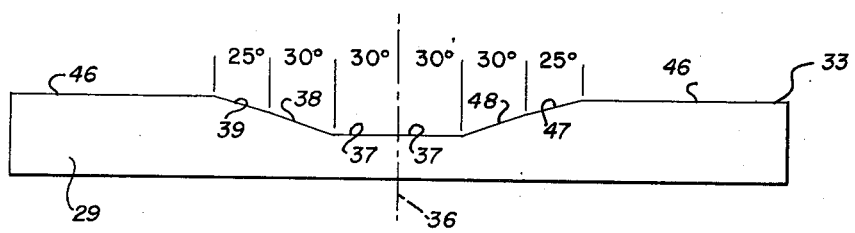
FIGURE 9 is a diagrammatic representation of the cam mechanism of the device, illustrating the cam laid out on a straight line.

In this respect FIGURE 9 will be seen to show the cam 29 projected along a straight path to more clearly illustrate the various portions of the cam surface 33 which engages the respective rollers 34 to effect the container reciprocation of the present invention. The zero point represents a radial line through the bowl midway of the intake station 13 and the take off station 18, such as line 36 of FIGURE 1 and also illustrated in FIGURE 9. At this point, a roller 34 will be riding on a lowermost horizontal portion 37 of the cam surface and the associated platform 23 will be disposed in the plane of the conveyor belt 11, as illustrated in FIGURE 3 on the left-hand side thereof. The portion 37 extends for some 30 degrees beyond the line 36 and during this period of rotation of the filling means a container is transferred from the conveyor 11 to the filling means 14 while remaining in the plane of the conveyor. The approximately next 30 degrees of cam surface will be seen to rise sharply as indicated at 38, raising about 1½ inches, at which time the platform carrying the container is thus caused to be elevated rapidly to a point where the upper open end of the container is spaced a short distance below its associated valve 16. The cam surface then gradually rises approximately ¾ inch, as indicated at 39 for substantially 25 degrees wherein the roller slowly elevates the platform to the uppermost valve actuating position. During this period of gradual elevation portions of solid product which may be extending exteriorly of the container will first be contacted by the valve 16 and gently urged within the confines of the container. The upper open end of the container next engages an annular portion 41 of the valve (see FIGURE 4) to force it upwardly against the bias of a spring 42 which normally maintains the valve in a closed position. The container moves the annular portion 41 upwardly relative to a fixed valve head 43 thereby opening a substantially annular passage between the head, which is thus positioned within the container, and the annular portions 41 to allow product flow from the bowl 17 into the container. In this connection it will be noted that venting means 44 provided in the valve head is offset from the center thereof to provide a passage therethrough of a maximum area to facilitate the flow of liquid products in which solid or semi-solid particles such as found in soups or the like may be included.

The valve is maintained in its open filling position as shown at the right hand side of FIGURE 3 for approximately 190 degrees while the roller traverses an uppermost horizontal surface 46 of the cam, following which the roller engages another gradually downwardly inclined surface 47 corresponding to surface 39, in which the roller gravitationally descends for substantially 25 degrees of filler rotation. In such manner the container slowly disengages the annular portion of the valve 16 in order to prevent a suction being created in the container which would act to upset it and cause excessive spillage of the product as happens when the container is too rapidly lowered from valve contact. When the roller reaches the end of the gradually inclined cam surface 47, the container is completely disengaged from the valve and disposed a short distance below the valve. The cam surface thereafter rapidly descends as indicated at 48 corresponding to the rising surface 38, to the lowermost horizontal surface 37 so that the container is again disposed in the plane of the conveyor so that it may be carried out of the filling means to the conveyor belt by the take-off means 18.

Figure 4:
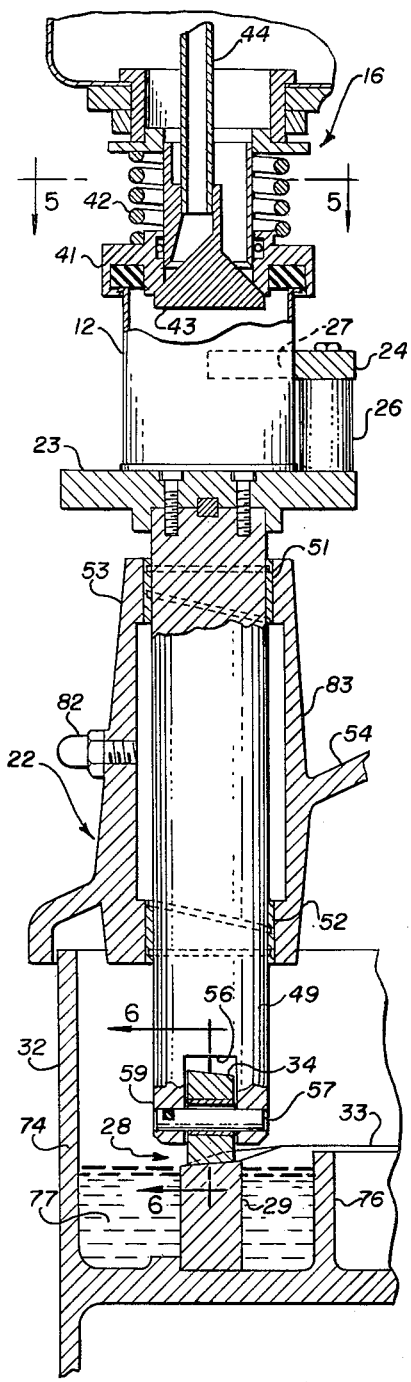
FIGURE 4 is an enlarged cross sectional view taken on the line 4—4 of FIGURE 1 showing a container positioned in an initial valve-engaging position prior to actual valve opening.
Figure 7:
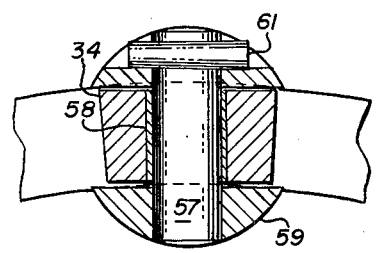
FIGURE 7 is a horizontal cross sectional view taken in the plane 7—7 of FIGURE 6.
Figure 8:
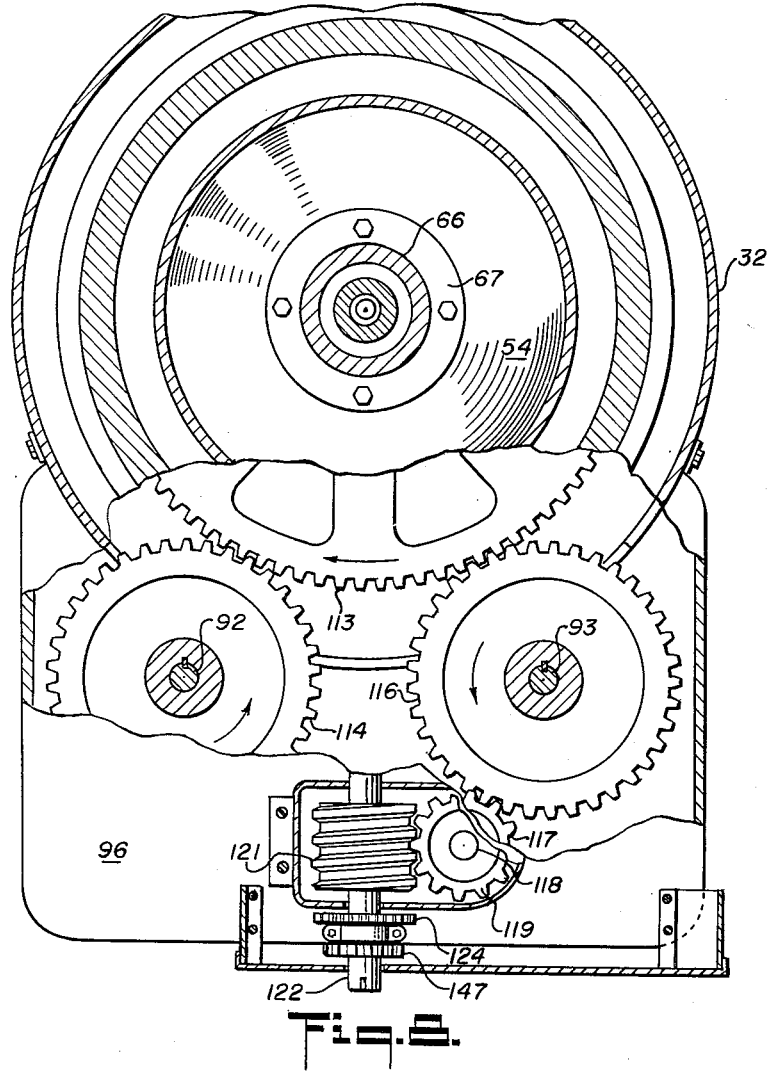
FIGURE 8 is a horizontal cross sectional view of the power transmission means taken substantially in the plane 8—8 of FIGURE 2.

Each platform 23 is operatively connected to a roller 34 whereby the vertical movement of the roller is transmitted to the platform. Such connecting means, as shown in FIGURES 3 and 4 will be seen to include a vertically disposed post 49 which is mounted for slidable movement by means of a pair of vertically spaced bearings 51 and 52 provided in a tubular extension 53 of a rotatable housing 54. The roller is carried at the lower end of the post 49 by means of a diametrical slot 56 provided therein for the reception of the roller 34 which is mounted on a roller shaft 57 by means of a bushing 58 disposed in the bore of the roller. The shaft 57 is journaled in leg portions 59 formed on either side of the slot 56 and is rigidly secured against rotation by means of a taper pin 61 inserted in an aperture suitably provided in one leg portion 59 and arranged to engage a transverse slot 62 formed in one end of the shaft. The upper extremity of the post carries the platform and is firmly secured thereto as by bolts or the like so that as the roller engages the various surfaces of the cam 29 the platform will follow an identical course of vertical movement.

As previously mentioned, the container elevating means 22 is arranged to rotate with and at the same speed as the bowl 17 so that once a container is introduced into the filling means 14 it will be properly aligned under an associated valve during its entire travel through the filling means. To this end a vertically extending hollow center shaft 63 having drive means, later to be described, is operatively connected for unitary rotation to the bowl 17 and the container elevating mechanism 22. As shown in FIGURE 3 of the drawings the upper end of the shaft 63 is enlarged as at 64 and has keyed or otherwise secured thereto a vertically extending cylindrical member 66. The lower extremity of the tubular member 66 is flanged at 67 for attachment by bolts or the like to a centrally embossed portion 68 of the rotatable housing 53. The member 66 has secured thereto in fixed relation, in a manner later to be described, a clamp member 69 having an upper flanged end 71 bolted or otherwise secured to a centrally located boss 72 provided on the bottom 19 of the bowl. Thus it will be seen that rotation of the center shaft 63 will effect rotation of the bowl 17 in which are mounted the valves 16 as well as rotation of the housing 53 in which the platform and roller carrying posts 48 are mounted.

Means are provided for vertical adjustment of the bowl 17 relative to the elevating means in order to permit the filling of containers of various heights. To this end, as illustrated in FIGURE 3, I have externally threaded the cylindrical member 66 for engagement with internal threads provided in the clamp mmeber 69. Rotation of the bowl independently of the elevating means will cause the clamp member to ride up or down on the cylindrical member to obtain the desired adjustment and the clamp member is then tightened by means of a locking bolt 73 to insure unitary rotation of the filling means with shaft 63.

Figure 5:
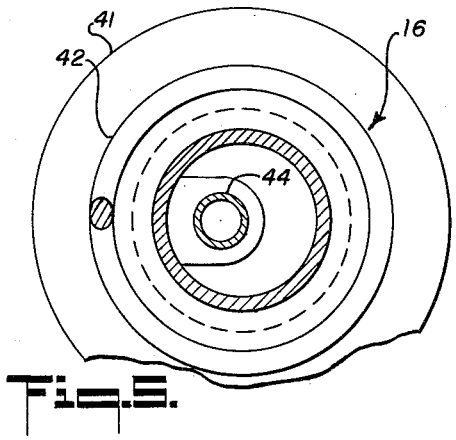
FIGURE 5 is an enlarged horizontal cross-sectional view of the valve taken substantially in the plane 5—5 of FIGURE 4.
Figure 6:
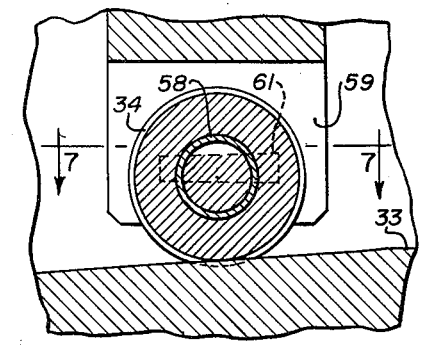
FIGURE 6 is a vertical cross sectional view of the cam roller structure taken substantially in the plane 6—6 of FIGURE 4.

In order to insure smooth and efficient operation of the container elevating mechanism 22 I have incorporated therein novel self-lubricating means whereby the rotation of the rollers 34 and the vertical movement of the posts 48 act to lubricate the associated bearing surfaces. In this respect it will be seen that the stationary housing 32 is provided with a circular exterior wall 74 while spaced radially inwardly therefrom a second wall 76 having an annular channel 77 defined therebetween in which a supply of lubricating oil may be introduced through a suitable connection 78 provided in the wall 74 of the housing. Referring to FIGURES 3–5 of the drawings, it will be seen that the cam 29 is mounted within the channel 77 and the normal oil level therein extends substantially three-fourths of the height of the cam at the uppermost surface 46 thereof. Thus it will be seen that the rollers will be partially submerged in the oil bath while traversing the surfaces 37, 38 and 48 of the cam, and the roller portions extending above the oil level will be coated with a film of oil which will tend to drip downwardly thereby filling a space 79 formed between the bushing 58 and a flattened side 81 formed in the top portion of the shaft so as to provide ample bearing lubricant at all times. It will likewise be understood that the oiled rollers will act to continuously lubricate the exposed or unsubmerged cam surfaces 39, 46, and 47. In this manner the supply of oil in the channel 77 will remain substantially constant over long periods of time as the oil can only drip back into the channel and cannot be dissipated by leakage. As a result, the time required to maintain the rollers in efficient operating condition is reduced to a minimum.

Considering now the improved means for lubricating the vertically moving posts 49 and referring to FIGURES 3 and 4 of the drawings each of tubular extension 53 of the rotatable housing will be seen to be provided with a grease gun connection 82 whereby grease is introduced into an annular space 83 defined by the inner periphery of the extension 53 and the post 49 and extending vertically between the bearings 51 and 52. Each bearing is provided with a lubricating groove extending about its inner periphery one end of which is in communication with the grease filled annular space as indicated at 84. The groove spirals around the inner periphery of the bearing to describe preferably one complete spiral 86 before terminating in a horizontally disposed groove 87 spaced inwardly from the outer end of the bearing. Thus it will be seen that reciprocal vertical movement of the post 48 will tend to force grease into and along the grooves so that the entire circumference of the posts will be effectively lubricated to reduce wear on the parts and to insure a smoothly uniform sliding action.

As previously mentioned, the containers are transferred from the conveyor 11 at the intake station 13 into the filling means 14 and subsequently removed therefrom back to the conveyor at the take-off station 18. Such intake and take-off means may be similar to that disclosed in my prior patent, No. 2,837,127 and will be seen to comprise a pair of rotatable star wheels 88 and 89 which are keyed as at 91 to the upper distal ends of a pair of shafts 92 and 93 respectively which are mounted in vertically disposed sleeves 94 which are mounted at their lower extremities on an auxiliary housing 96 adjacent the main housing. The star wheels are provided with a plurality of semi-circular openings 97 and 98 respectively which are arranged to mesh with the openings 27 in the members 24 carried by the platforms. The intake station further includes a variable progressive pitched worm 99 and an adjustable guide bar 101 which are disposed on opposite sides of the conveyor belt adjacent the star wheel 88 and arranged to feed the containers into the star wheel in properly timed sequence. The star wheel then moves the container in a counter-clockwise direction (as viewed in FIGURE 1) from the conveyor belt to the platform 23 at which point an opening 97 of the star wheel and an opening 27 of the guide member mesh to substantially encircle the periphery of the container. As heretofore discussed, when a platform has been rotated to the intake or take-off stations its associated roller traverses the lowermost cam surface 37 of the cam so that the platform is likewise disposed at its lowermost or container receiving and removal position. As shown in FIGURES 2 and 3 of the drawings the platforms 23 at this point are disposed in coplanar relation with a horizontally extending plate member 102, one side of which is provided with a medially located concave portion 103 adapted to receive in generally abutting relation the outer periphery of the platforms. A longitudinally extending groove 104 is further provided in the plate 102 adjacent the opposite side thereof in which is disposed the upper reach of the conveyor so that the container is moved by the star wheel 88 from the conveyor belt across the plate 102 onto the platform 23 over a substantially uninterrupted flat horizontal surface. The plate 102 is secured in fixed relation to the pair of vertically disposed sleeves 94 subjacent the star wheels which lie in a common horizontal plane with the members 24 of the platforms.

The container having been thus positioned on a platform the intake star wheel continues its counterclockwise rotation while the platform similarly rotates about shaft 63 to carry the container out of engagement with the star wheel. At this point a curved guide rail 106 engages the sides of the containers opposite the openings in the members 24 so that the containers are positively held against displacement in proper vertical valve alignment during container elevation. Shortly after the containers have reached a valve engaging position wherein the valves themselves act to hold the containers on the platform the guide rail 106 terminates. A similar vertically adjustable guide rail 107 is likewise provided adjacent the take-off means in order that the containers may once again be engaged on opposite sides shortly before valve disengagement to maintain them properly positioned on the platform for engagement with an opening in the take-off star wheel 89.

The guide rail 107 further serves as a cam by which the platforms may be automatically lowered during container descent in the event the platforms fail to gravitationally descend along the path defined by the cam surfaces 47, 48 and 37. In this respect it will be seen that the plane of the rails is inclined vertically upward from the respective star wheels to substantially the horizontal center line of the filling means as seen in FIGURE 1 so that the rails desirably are spaced only a fraction of an inch above the platform throughout ascent and descent thereof.

It should also be pointed out here that the outer corner of the trailing side of each platform is cut away as indicated at 108 so that the star wheels may be cleared by the platforms as they commence their ascent and complete their descent.

It will be understood that the platforms 23, the star wheels 88 and 89 rotate at the same rate of peripheral speed in order to provide uniform movement of the containers through the apparatus. In this respect and as previously described the bowl 17 and the container elevating mechanism 22 are operatively mounted for simultaneous rotation on the hollow center shaft 63 which is journaled in roller bearings 109 mounted in a guide column 111 secured to and extending upwardly from the plate 31 of the main housing 32. The upper extremity of the column 111 is disposed within a counter bore provided in the lower surface of the boss 68 of the rotatable housing 52 in order to insure adequate vertical stability therefor. The lower distal end of the shaft 63 is keyed at 112 to a main gear 113 which meshes with a pair of identical gears 114 and 116 whose diameters are substantially one-half the diameter of the main gear. Gears 114 and 116 are keyed to the lower extremities of the shafts 92 and 93 respectively which carry the star wheels 88 and 89. Meshing with the gear 116 is a small gear 117 fixed at the lower end of a vertically disposed stub shaft 118 which is journalled in bearings mounted in the auxiliary housing 96. Secured to the shaft 118 in spaced relation above the gear 117 is a worm gear 119 which engages at right angles a worm 121 rigidly secured to one end of a horizontally disposed drive shaft 122 journalled in bearings mounted on the auxiliary housing 96 and having one end extending through the housing 96 to a motor (not shown). It will thus be apparent that when the shaft 122 is rotated by means of the motor, power is transmitted through the worm 121 and its gear 119 to the gears 117 and 116 and thence to the main gear 113 which in turn rotates the gear 114. Rotation of the gears 113, 114 and 116 transmits rotation to the filling means 14 and the star wheels 88 and 89. It will be seen that the diameters of the gears 114 and 116 are approximately one-half the diameter of the main gear 113 thereby providing a 2 to 1 gear ratio so that the star wheels and the filling means rotate at substantially the same rate of peripheral speed.

In order to transmit rotation to the variably pitched worm 99 a chain drive 123 has been here provided including a drive wheel 124 mounted for rotation on the motor shaft 122 and a driven wheel 126 having a diameter substantially equal to that of the drive wheel 124, mounted on one end of a horizontally disposed stub shaft 127 which is suitably journalled on the plate member 102. The distal end of the shaft 127 is provided with a helical gear 128 which drives at right angles a helical gear 129 rigidly carried by an extension of the worm 99. While it will be readily apparent that the instant gear train is in general similar to that disclosed in my prior patent, No. 2,837,127 it will be appreciated that by employing as hereinabove described, the worm 121 and gear 119 as well as the chain drive 123 as the power transmission means from the motor shaft, I have effectively and economically prevented transmission failure previously encountered which has been caused by gear disengagement due to vibration of the apparatus.

In the present invention I have additionally provided adjustable timing means 131 whereby the last wrap 132 of the worm 99 may be selectively advanced or retarded according to the speed of the conveyor and the weight of the containers in order that the containers may be advanced in properly timed relation to an engaging position with the openings in the star wheel 88. As disclosed in my above mentioned prior patent the first small wraps of the worm move at a slower rate of speed than the conveyor to slow down a container while the succeeding larger wraps accelerate the container faster than the speed of the belt and the last wrap 132 is synchronized with the forward speed of the star wheel 88 and such wrap advances the container so as to be engaged by an opening of the star wheel at the proper time. In this connection it will be understood that a glass container, for example, being heavier than a tin container of the same size will be moved farther along the conveyor than the latter so that the last wrap of the worm will need to be retarded accordingly for proper container engagement with the star wheel.

Such timing means 131, as shown in FIGURE 2 will be seen to comprise a pair of idler sprockets 133 mounted in horizontally spaced relation on a bracket 134 which is mounted for slidable adjustment on the undersurface of the plate member 102 by means of a pair of guide pins 136 engaging a slot 137 provided in a flange 138 of the bracket. The idler sprockets are thus adapted to engage opposite sides of the loop defined by the chain 123 so that either sprocket may be caused to exert a tension on the side of the loop engaged so that the driven wheel 126 may be accordingly rotated to the left or right as viewed in FIGURE 2 which in turn will retard or advance the wrap 132 through rotation of the helical gears 128 and 129.

Manual adjustment of the bracket 134 is provided by means of a threaded stem 139 having its free end mounted for rotation in an ear 141 extending from the bracket. A lug 142 depending from the plate 102 threadedly engages the stem so that rotation thereof will effect horizontal movement of the bracket to advance or retard the worm wrap 132 as desired. Lock nuts 143 carried on the stem 139 may then be threaded up against either side the lug 142 in abutting relation thereagainst to maintain the idler gears in the adjusted position.

Considering now the conveying means whereby containers are delivered to the intake station and carried from the take off station, prior art devices have heretofore employed two separate conveyor belts having drive means independent of that of the filling apparatus. As a result it has been difficult to properly synchronize the speed of travel of the conveyor belt with that of the rest of the device. In order to overcome the foregoing difficulty, I have provided the single conveyor belt 11 which derives its power from the motor shaft 122 by means of a chain drive 144 engaging a drive wheel 146 mounted on the drive shaft and a driven wheel 147 approximately one-half the diameter of the wheel 146 mounted on a conveyor shaft 148. Additionally, the conveyor 11 is mounted by means of roller 149, one being mounted on the shaft 148 on the plate member 102 whereby the conveyor forms an integral part of the apparatus. In this way, the device becomes a readily portable compact unit whose location in a plant may be easily changed when desired.

It will also be noted that the auxiliary housing 96 in which is disposed as heretofore described a major portion of the power transmission means is releasably secured to the main housing as by bolts or the like in order to permit ready access to the transmission means for repairs, greasing or like purposes.

In any liquid filling device, it will be appreciated that a certain amount of product spillage is likely to occur and that if the product is allowed to leak into the operating mechanism the efficiency of the apparatus will be impaired. Therefore, in order to prevent product leakage into the mechanism I have designed the rotary housing 54 as a single casting the plane of which inclines radially downwardly from the boss 68 to the upper open end of the main housing 32 so that spilled product will gravitationally drain off the rotary housing away from the mechanism of the apparatus.

When it is desirable to feed containers of smaller diameters through the filling means the semi-circular openings in the star wheels 97 and 98 as well as the openings in the members 24 may be reduced as necessary by the provision of bushings 157 therein which have openings of substantially the same diameters as the containers being used so that adequate container engagement as above described will be maintained.

Additionally, the bottom 17 of the bowl may be provided with outlet means 152 whereby the liquid product may be drained from the bowl for purposes of cleaning or the like. Such means will be seen to comprise a vertically extending drain pipe 153 having an upper flanged end 154 which is disposed in a central opening of the bottom of the bowl and secured thereto in liquid tight relation by means of bolts or the like. The pipe passes downwardly through the hollow center shaft 63 to terminate exteriorly thereof for connection with a return line 156 by which the liquid product may be carried to a central source of supply (not shown).

Commencing now with a complete cycle of operation, the containers 12 are carried by the conveyor belt 11 to the intake station 13 where they are engaged on opposite sides by the variable pitched worm 99 and the guide bar 101 in order that each container may be advanced into an engaging position with a semicircular opening 97 of the intake star wheel. The star wheel rotates in a counter-clockwise direction to move the container from the conveyor belt to a platform 23 of the filling means which is disposed in the same plane as the conveyor belt by virtue of the cam roller 34 which is operatively connected to the platform engaging the lowermost surface 37 of the cam 29. The star wheel and platform rotate at the same rate of peripheral speed and when the container is initially positioned on the platform the opening 97 of the star wheel and the openings of the member 24 carried by the platform are in mesh so that the container is substantially encircled therewithin and aligned directly under a valve 16. Clockwise rotation of the platform moves the container out of engagement with the star wheel 88 to commence its rapid ascent to a point just short of valve engagement due to the roller traversing the cam surface 38. The roller next travels up the cam surface 39 whereby the container is gradually elevated first to engage the valve and then to open same to allow liquid product to flow into the container. The valve is held in an open position during approximately half the rotation of the filling means during which time the roller of the platform engages the uppermost horizontal cam surface 46. The roller thereafter engages the cam surface 47 so that the container gradually descends from the valve actuating position to one where the container is spaced slightly below the valve. The roller next contacts the cam surface 48 to rapidly lower the container to the conveyor plane so that it may be engaged at the take-off station 18 by an opening 98 of the star wheel 89 which meshes with the opening in the member 24 of the platform. The star wheel 89 rotates in a counter-clockwise direction and guides the filled container from the filling means back onto the conveyor belt 11 where it is removed from the apparatus.

What is claimed is:

1. Apparatus of the character described including a product supply bowl, a plurality of valves circumferentially spaced and depending from said bowl and adapted for opening upon engagement therewith by a container to be filled with product, a container-supporting platform in alignment with and positioned subjacent respective ones of the valves, means supporting and rotating said bowl and said platforms about a common vertical axis, a stationary annular cam positioned subjacent said platforms and including an upper surface of varying vertical spacing from said valves, each of said platforms having cam-engaging means depending therefrom whereby said platforms may be selectively raised and lowered during said rotation thereof, and an open top lubricant reservoir in which said cam is positioned, the open top of said reservoir lying in a horizontal plane above at least a portion of the upper surface of said cam.

2. Apparatus as set forth in claim 1 including stationary can-engaging guide means disposed adjacent said platform in overlying relation thereto, and including a downwardly extending portion engageable with said platforms for urging the latter downwardly during lowering of the platforms.

3. Apparatus of the character described comprising a horizontally disposed conveyor, a first and second star wheel mounted for rotation about spaced vertical axes and each having container-receiving pockets along the periphery thereof, sequential ones of said pockets overlying said conveyor during wheel rotation, a worm positioned adjacent said conveyor and said first star wheel for urging containers from said conveyor into said pockets, a filler bowl having a diameter normal to said conveyor medially of said star wheels, said bowl having a plurality of circumferentially spaced filler valves depending therefrom, a plurality of container-supporting platforms with a platform disposed subjacent each of said valves, means vertically reciprocating said platforms, means rotating said bowl and platforms about a common vertical axis, arcuate container engaging means carried by each platform, said last named means defining a substantially complete enclosure with a star wheel pocket on each star wheel during platform rotation, and said platform lying in the plane of said conveyor when adjacent said wheels and lying in an elevated plane when remote from said wheels, means for selectively retarding and advancing the final wrap of said worm during bowl rotation, said worm being positioned adjacent one longitudinally extending edge of said conveyor, and a laterally adjustable guide bar positioned adjacent the other edge thereof.

4. Filling apparatus including a product supply means, a plurality of valves operatively connected to said supply means, a plurality of container supporting members with each of the latter being disposed subjacent and in alignment with the respective valves, means rotating said valves and said members about a common vertical axis, a stationary annular cam positioned subjacent said platforms, each of said platforms having a cam follower operatively engaged with the upper surface of said cam, one-half of the circumferential extent of said upper surface having a first horizontal portion extending for about 30 degrees of arc, a continuing second upwardly inclined portion extending for about 30 degrees of arc, a third upwardly inclined continuing portion extending for about 25 degrees of arc with the amount of incline being less than that of said second portion and a fourth horizontal continuing portion extending for about 95 degrees of arc, the other half of said surface being complementary to said first one-half whereby the uppermost horizontal cam surface extends for more than one-half the circumferential extent thereof, and an annular lubricant reservoir having an open top intermediate the lower and upper cam portions whereby at least said first portion of said cam surface may be immersed in a liquid.

5. Container filling apparatus including a product supply bowl, a plurality of valves circumferentially spaced and depending from said bowl and adapted for opening upon engagement therewith by a container to be filled with product, a container-supporting platform in alignment with and positioned subjacent respective ones of the valves, each of said platforms having a vertical post member secured to and depending therefrom, guide means slidably receiving each of said members for vertical reciprocation thereof, a roller journalled adjacent the bottom of each member, a stationary annular cam having an upper cam surface in engagement with said rollers, a vertical shaft supporting said bowl and said guide means about a common central vertical axis, and means rotating said bowl and guide means about said axis, each of said guide means including a housing defining an annular space with its post member and having vertically spaced bearings adjacent the upper and lower ends thereof, means for introducing lubricant into said space, and each bearing being provided with a spiral groove in communication with said space and in immediate adjacent relation with the post member whereby lubricant in said space will be moved along said bearing during vertical reciprocation of said post members.

6. Apparatus of the character described including a product supply bowl, a plurality of valves circumferentially spaced and depending from said bowl and adapted for opening upon engagement therewith by a container to be filled with product, a container-supporting platform in alignment with and positioned subjacent respective ones of the valves, means supporting and rotating said bowl and said platforms about a common vertical axis, a stationary annular cam positioned subjacent said platform and including an upper surface of varying vertical spacing from said valves, and each of said platforms having cam-engaging means depending therefrom whereby said platforms may be selectively raised and lowered during said rotation thereof, said last named means including a vertically disposed post having its upper end secured to said platform and having a fixed horizontal shaft adjacent the lower end, a cam follower roller journalled for rotation on said shaft and having a shaft-receiving bore substantially larger than the shaft whereby when said roller is in engagement with said cam, a space being provided between the upper peripheral portion of the shaft and the roller bore for permitting lubrication thereof, and means defining an annular lubricant reservoir having an open top in which at least the lowermost portions of the upper cam surface is immersed.

References Cited in the file of this patent
UNITED STATES PATENTS

| | | |
|---|---|---|
| 1,894,007 | Schmidt | Jan. 10, 1933 |
| 1,985,767 | DeMarkus | Dec. 27, 1934 |
| 2,202,033 | Stewart et al. | May 28, 1940 |
| 2,261,705 | Weaver | Nov. 4, 1941 |
| 2,455,723 | Ardron | Dec. 7, 1948 |
| 2,574,746 | Luther | Nov. 13, 1951 |
| 2,642,214 | Lippold | June 16, 1953 |
| 2,643,806 | Milne | June 30, 1953 |
| 2,645,399 | Bozek et al. | July 14, 1953 |
| 2,699,282 | Day et al. | Jan. 11, 1955 |
| 2,837,127 | Luther | June 3, 1958 |
| 2,949,941 | Mojonnier | Aug. 23, 1960 |

FOREIGN PATENTS

| | | |
|---|---|---|
| 369,693 | Great Britain | Mar. 31, 1932 |